(12) United States Patent
Zanier

(10) Patent No.: US 7,434,331 B2
(45) Date of Patent: Oct. 14, 2008

(54) DIMENSION MEASURING INSTRUMENT AND HEIGHT GAUGE

(75) Inventor: Adriano Zanier, Prilly (CH)

(73) Assignee: TESA SA, Renens (CH)

( * ) Notice: Subject to any disclaimer, the term of this patent is extended or adjusted under 35 U.S.C. 154(b) by 37 days.

(21) Appl. No.: 11/732,566

(22) Filed: Apr. 4, 2007

(65) Prior Publication Data
US 2007/0245586 A1 Oct. 25, 2007

(30) Foreign Application Priority Data
Apr. 19, 2006 (EP) ................................. 06112762

(51) Int. Cl.
*G01B 5/02* (2006.01)
(52) U.S. Cl. ........................................................ 33/832
(58) Field of Classification Search .................... 33/832
See application file for complete search history.

(56) References Cited

U.S. PATENT DOCUMENTS

| | | | |
|---|---|---|---|
| 4,924,598 A | | 5/1990 | Gruhler |
| 5,040,308 A | | 8/1991 | Meyer |
| 5,373,645 A | * | 12/1994 | Bezinge et al. ................ 33/703 |
| 5,979,070 A | * | 11/1999 | Lau .............................. 33/559 |
| 6,401,352 B1 | * | 6/2002 | Kimura et al. ................. 33/832 |
| 6,467,184 B1 | * | 10/2002 | Wust et al. ..................... 33/832 |
| 6,763,604 B2 | * | 7/2004 | Jordil et al. .................... 33/832 |
| 7,263,780 B2 | * | 9/2007 | Jordil et al. .................... 33/556 |
| 7,263,786 B1 | * | 9/2007 | Zanier ......................... 33/832 |
| 2003/0106236 A1 | * | 6/2003 | Jordil et al. .................... 33/832 |
| 2006/0191154 A1 | * | 8/2006 | Kraemer ........................ 33/832 |

FOREIGN PATENT DOCUMENTS

EP 1 089 051 A1 4/2001

* cited by examiner

*Primary Examiner*—Christopher W Fulton
(74) *Attorney, Agent, or Firm*—Pearne & Gordon LLP

(57) ABSTRACT

Dimension measuring instrument having a probe moving along a measuring axis. An elastic transmission element allows the probe to move under the action of the measuring force. If necessary, the probe can be coupled rigidly with the instrument, for example to perform profile measurements or tracings. The instrument is entirely protected by a casing from liquid projections and dust, and the probe can be locked without opening the casing or accessing its inside.

23 Claims, 9 Drawing Sheets

DIMENSION MEASURING INSTRUMENT AND HEIGHT GAUGE

REFERENCE DATA

This application claims priority from European patent applications No. 2006EP-112762 filed on Apr. 19, 2006, the contents whereof are hereby incorporated by reference.

1. Technical Field

The present invention concerns an instrument for measuring dimensions, in particular for measuring linear dimensions, and more particularly, but not exclusively, a height gauge comprising such an instrument.

2. State of the Art

Measuring instruments such as height gauges and coordinate measuring machines are used for the high-precision measurement and size control of mechanical parts. They supply measurements of an accuracy that is often on the order of several micrometers.

These instruments are generally associated to a horizontal surface plate or measuring bench on which the part to be measured or to be controlled is placed in a chosen position so that this bench constitutes a reference plane.

Depending on the type of apparatus, the latter comprises either three guides oriented in parallel to three rectangular coordinate axes, of which two are inscribed in the plane of the measuring bench, as on three-dimensional measuring apparatus, or a single guide oriented perpendicularly to the plane of the measuring bench, as in the case of height gauges.

On column gauges, the guide is fastened vertically on a rigid basis having a resting sole that can move on the reference plane by sliding or on an air cushion so that it is possible to access the part to be measured from all sides.

The measuring instruments generally also have, on each measuring axis, a high-precision opto-electronic position encoder as well as an electronic control and display device, possibly contained in a control panel visible to the operator, for displaying the dimensions read according to one or several measuring modes.

European patent EP0579961 in the applicant's name describes a vertical measuring column gauge with a measuring carriage sliding on a vertical guide. The measuring carriage includes a driving carriage sliding relative to the measuring carriage which transmits the vertical force acting on the measuring carriage. In this instrument, the connection between the measuring carriage and the driving carriage is elastic: a spring system connecting both carriages absorbs, and simultaneously makes it possible to measure, the force acting on the measuring carriage.

For certain measuring or tracing operations, however, this elasticity is not wished for. A mechanical coupling, that the operator can engage by actuating a control element of the carriage, then allows the measuring carriage and the driving carriage to be relatively locked.

Documents CH667726 and EP0223736 also describe measuring instruments having similar features.

These arrangements however have the disadvantage that the locking devices described here above require the operator to have access to the measuring carriage to actuate it. When the latter is surrounded by a housing or casing for protection, this access is not easy and requires additional openings to be provided in the housing.

On the other hand, dimension measuring column gauges and instruments without protective envelope are also known. In these instruments, the guide, which defines the measuring axis, as well as the encoder that generates the electric measuring signal, can be opened and are easily accessible from outside.

The disadvantage of this arrangement is that it affords no protection against external agents. When these instruments are used in a polluted or highly humid environment, which is often the case in machining workshops, dust as well as oil and water droplets present in the atmosphere are progressively deposited on the reference surfaces and on the graduated rules of the encoders, thus degrading the instrument's precision. The protective casing also has the task of protecting the guides and the mechanisms inside it from accidental shocks that could cause harmful deformations or mis-adjustments for the measurement accuracy.

SHORT SUMMARY OF THE INVENTION

One aim of the present invention is to propose a dimension measuring instrument free from the limitations of the known instruments.

Another aim of the invention is to propose a dimension measuring instrument in which the locking of the measuring carriage can be performed faster and more easily than in the prior art instruments.

Another aim of the invention is to propose a dimension measuring instrument in which the mechanisms for locking the measuring carriage can be actuated without exposing the instrument to atmospheric pollution.

These aims are achieved by the object of the independent claim, the dependent claims illustrating preferred embodiments of the invention. These aims are achieved notably by a dimension measuring instrument including:

a mobile carriage capable of moving parallel to a guide, with the guide defining a measuring axis;

a driving device connected to the carriage by a transmission including an elastic transmission element, so as to determine the linear movement of the mobile carriage;

a probe connected to the mobile carriage and designed to be brought into contact with a part to be measured;

coupling means that can be actuated by the operator and capable of taking up an unlocked state, wherein the forces acting on the mobile carriage are transmitted by the elastic transmission element that is free to deform under the action of these forces, and a locked state, wherein the forces acting on the mobile carriage are transmitted by the coupling elements without influencing the elastic transmission element;

wherein the measuring instrument includes a protective casing surrounding a protected volume in which the mobile carriage and the guide are placed.

Furthermore, these aims are achieved independently by a dimension measuring instrument having the characteristics of the preamble of independent claim 1; wherein the state of the coupling means can be modified by applying to the mobile carriage a force greater than a predetermined threshold.

The aims of the invention are also achieved independently by a dimension measuring instrument having the characteristics of the preamble of independent claim 1; wherein the state of the coupling means can be modified by moving the probe into a predetermined coupling position or in a predetermined uncoupling position.

BRIEF DESCRIPTION OF THE FIGURES

Embodiments of the invention are indicated in the description illustrated by the attached figures in which.

EMBODIMENTS OF THE INVENTION

Figure 1:
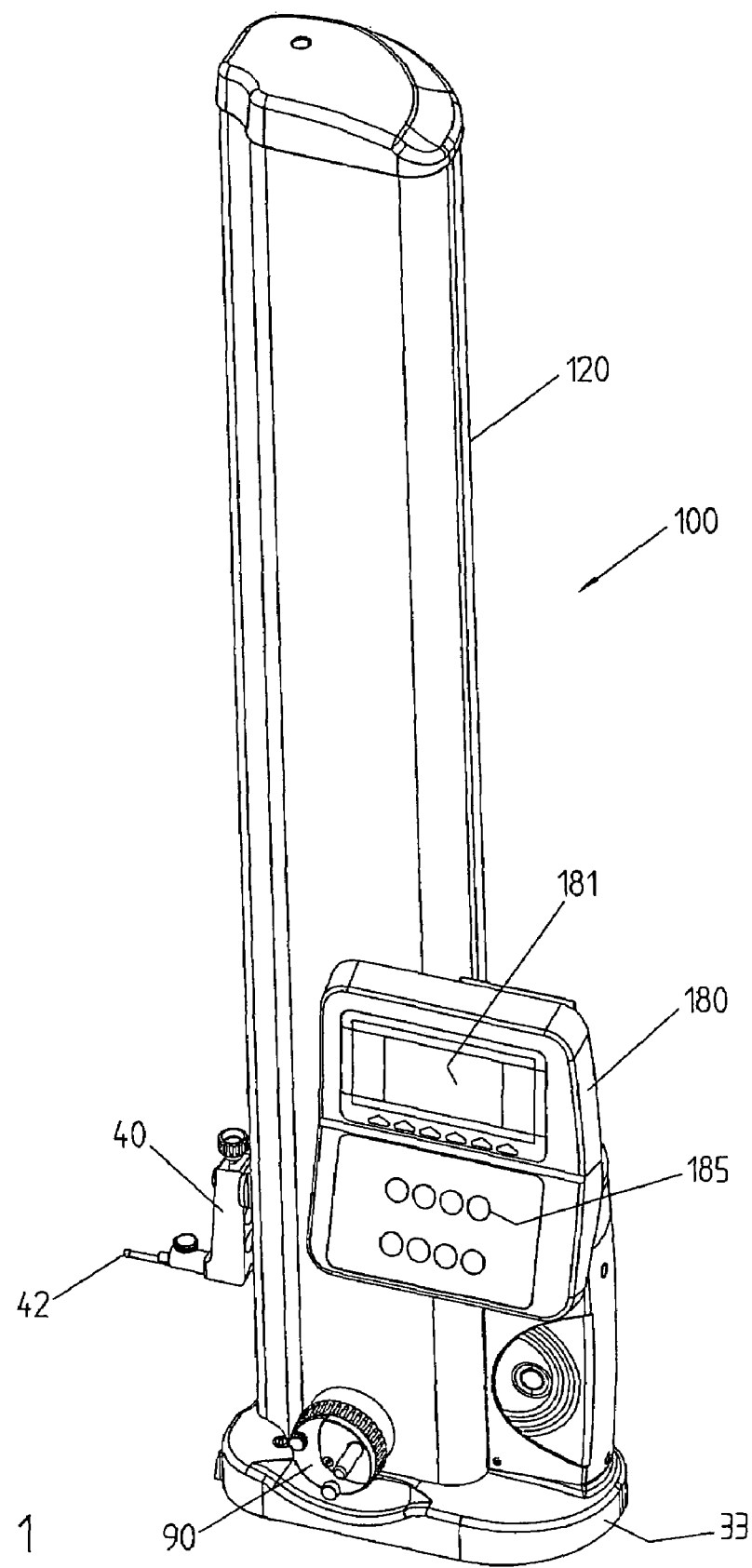
FIG. 1 illustrates a measuring instrument with a single vertical axis according to the invention.

FIG. 1 shows a vertical measuring instrument 100 having a base 33 designed to be placed on a reference plane (not represented), which bears also the part to be measured, and a probe 40 provided in the embodiment with a contact sphere 42 capable of moving along a vertical measurement axis under the action of the handle 90. Depending on the work to be performed, the probe 40 could also be equipped with other accessories, for example curved connecting rods, to measure difficultly accessible surfaces, a comparator for performing profile and perpendicularity measurements, or even a marking gauge for tracing horizontal lines.

A control panel 180 has inside it a casing that is impervious to pollutions, for example to projections of oil and water, as well as to humidity, an electronic control device (not visible) for computing the data relative to the current measurement and presenting them on the display 181. The control panel also includes data input keys 185 allowing the operator to supply to the controller data such as the calibration data, data saving or printing commands, or measuring mode switch commands. In one embodiment of the invention, inputting the measuring mode switch commands is also possible by operating the movement handle 90.

The casing of the panel 180 keeps the electronic devices it contains from projections of oil and water as well as from dust particles that are always abundant in mechanical workshops. As to the mechanical components of the measuring instrument 100, they are protected by the casing 120.

Figure 2:
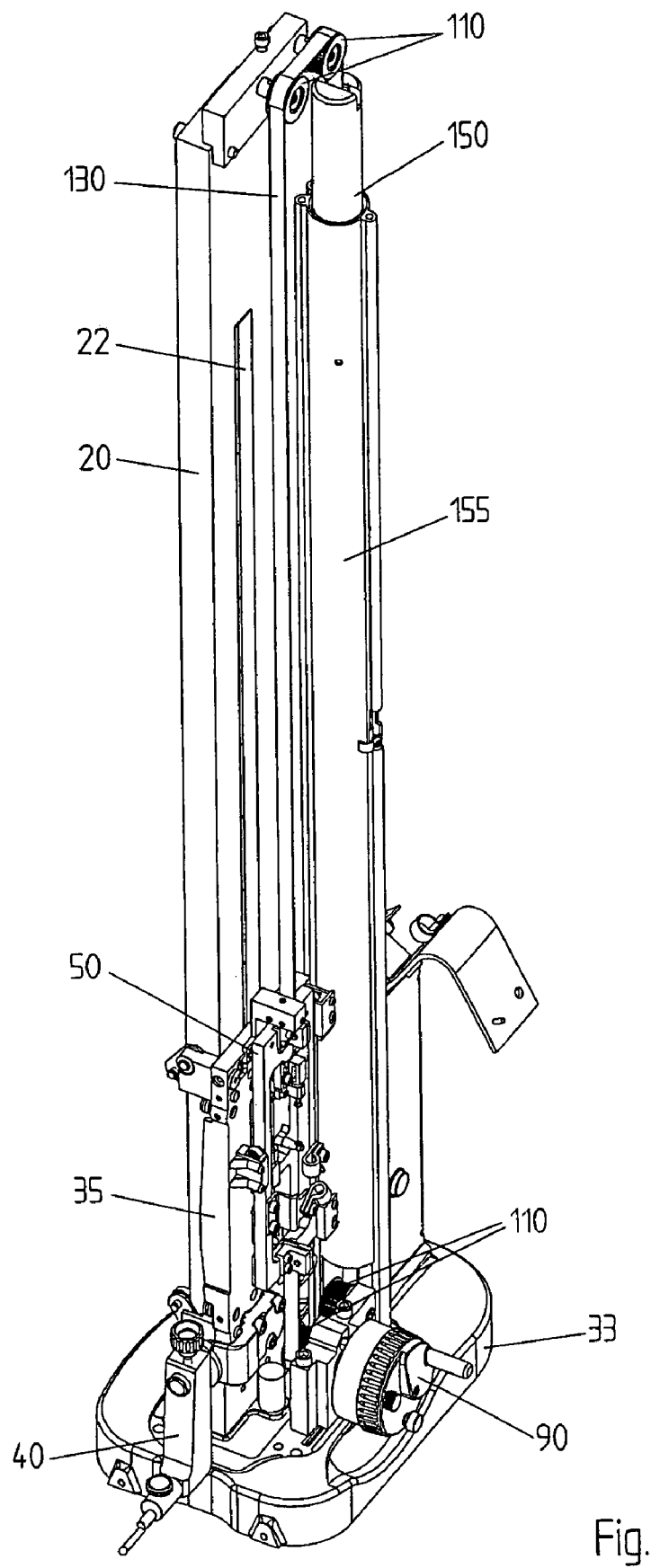
FIG. 2 shows the instrument of FIG. 1 without its protective casing.

FIG. 2 shows a measuring column gauge without the protective casing 120 and the panel 180, thus allowing the mechanical components of the instrument to be visible.

Figure 3:
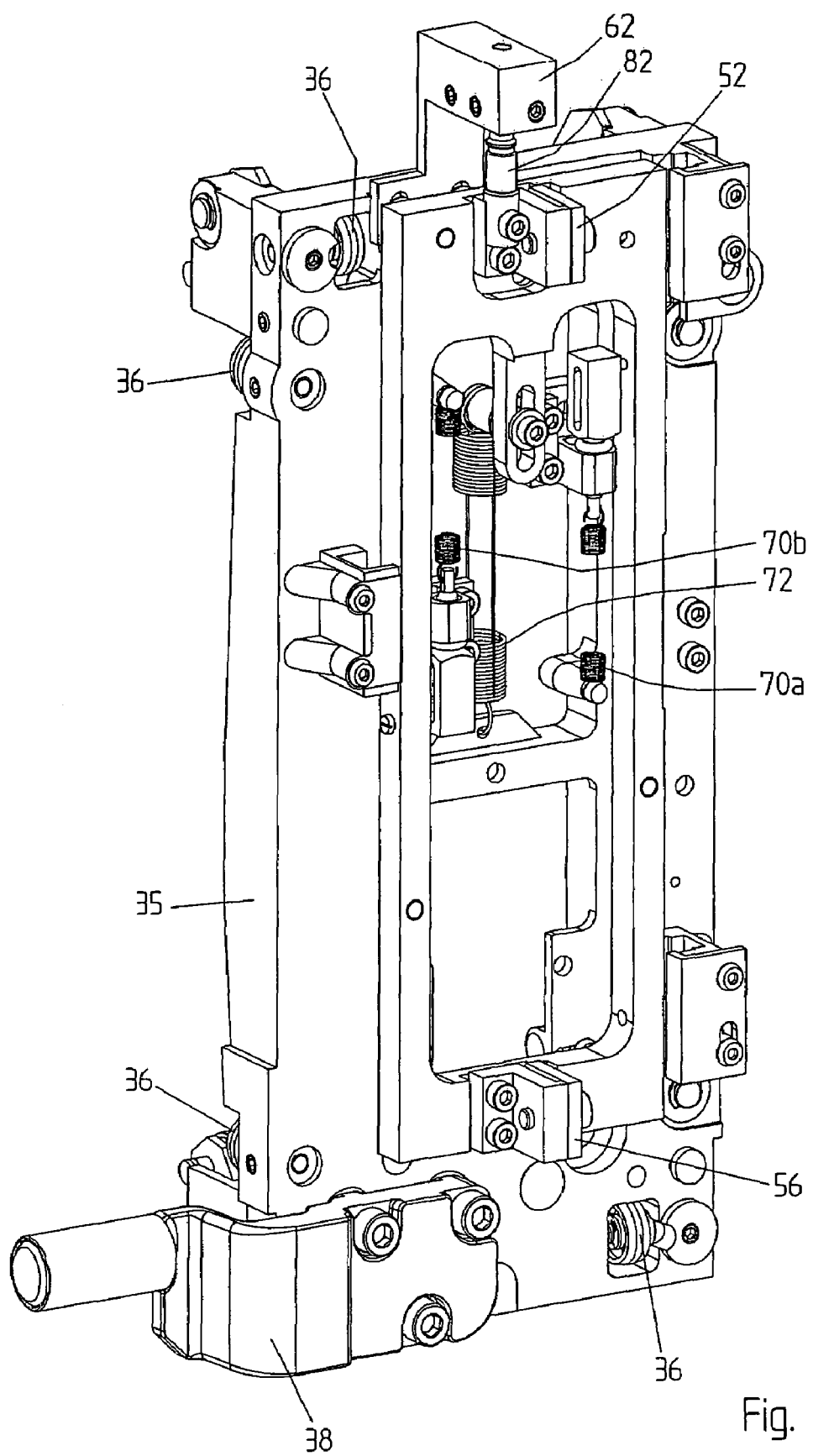
FIG. 3 shows in detail the measuring carriage and the transport carriage to which is connected a measuring instrument according to the invention.
Figure 4:
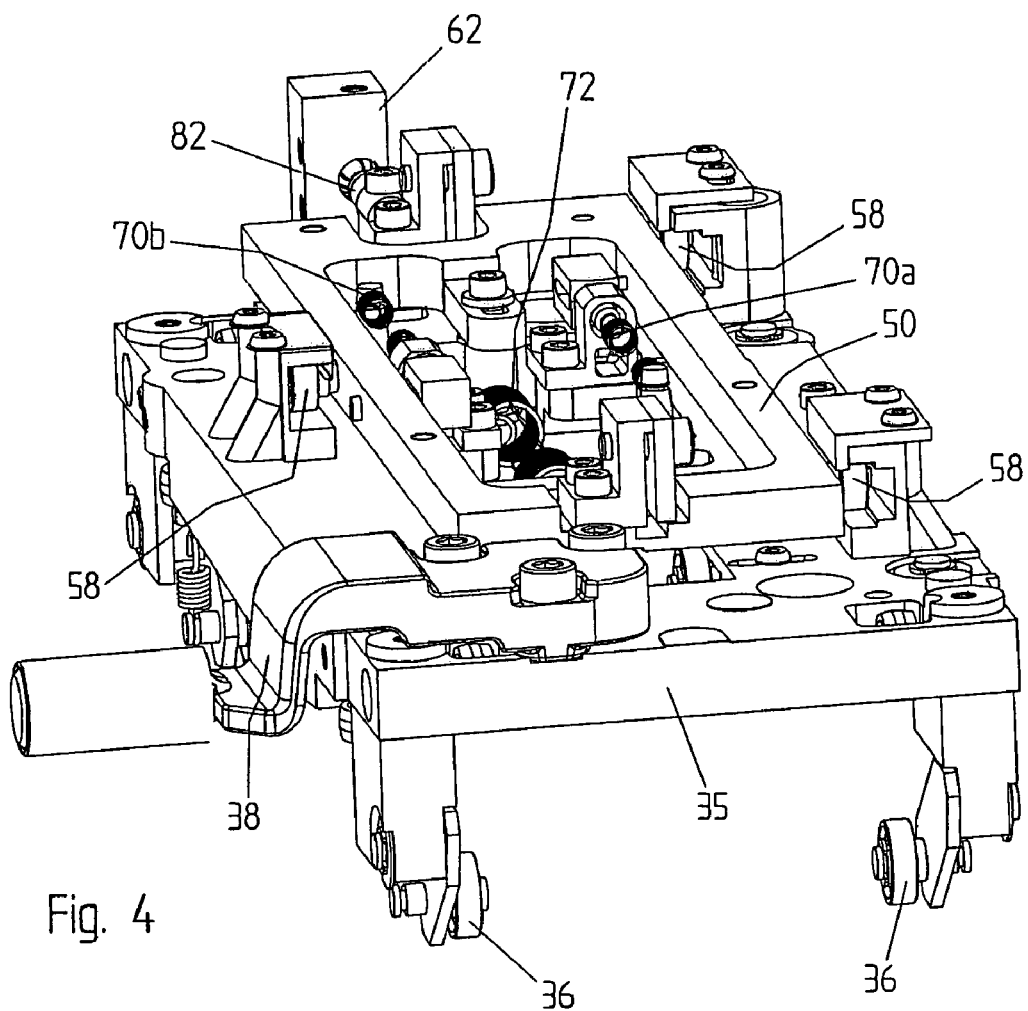
FIGS. 4, 5 and 8 illustrate the measuring and transport carriages of FIG. 3 seen from different views.
Figure 5:
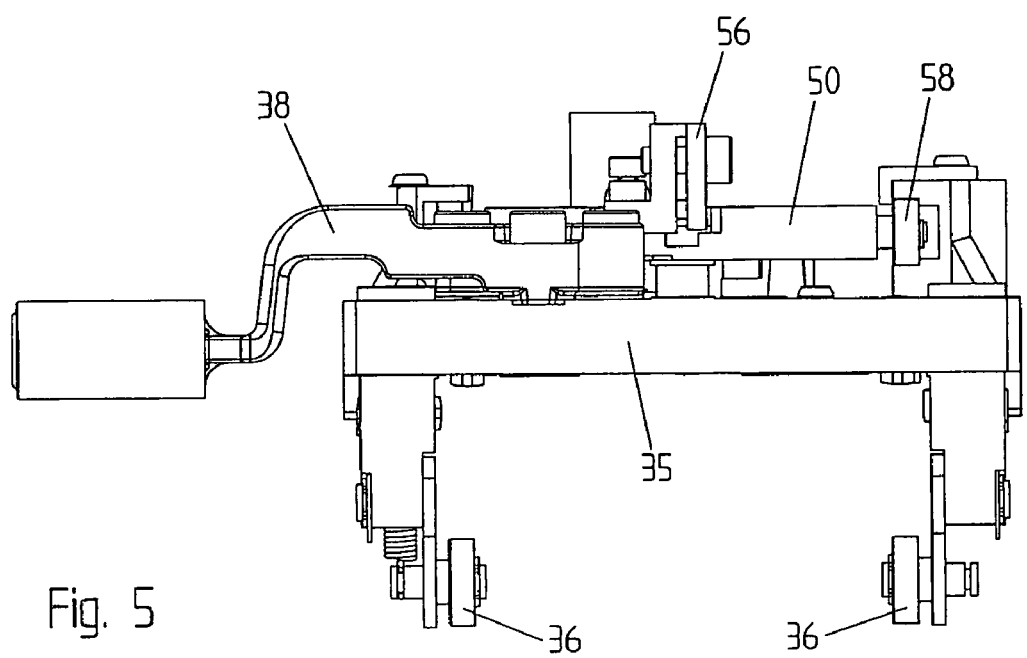

A guide 20, with rectilinear and exactly rectified vertical surfaces, defines the instrument's measuring axis. The measuring carriage 35 that bears the probe 40 moves without clearance on the guide 20 with the aid of roller system 36, better visible in FIG. 3 and following. The automatic clearance takeup is achieved by springs 37, of which one is visible in FIG. 9.

This arrangement ensures that the run of the measuring carriage 35 and, consequently, of the probe 40, is strictly rectilinear and parallel to the measuring axis. The one skilled in the art could obtain the same feature, still remaining within the frame of the invention, by other arrangements, for example with a cursor bearing the measuring probe sliding along a slide defining a rectilinear axis or by any other suitable guiding means.

Reverting now to FIG. 2, the vertical guide 20 bears, on a surface juxtaposed to the carriage 35, the glass ruler 22 of an optical position encoder having a regular sequence of reflecting graduations. An opto-electronic sensor 28 (FIG. 6) connected to the controller allows the position of the carriage 35 to be determined, in known manner, relatively to the rule 22.

Alternatively, the optical encoder constituted by the rule 22 and the opto-electronic sensor 28 could be replaced, whilst still remaining within the frame of the invention, with a position-determining device of a different kind, for example:

an interferential optical encoder;

an encoder of the magneto-resistive type, having a magnetized rule fixedly united with the guide 20 and having a network of magnetized areas according to two alternating directions, and a magneto-resistive sensor fixedly united with the carriage 35;

a capacitive encoder, in which the sensor fixedly united with the carriage 35 is sensitive to variations in capacity induced by a network of conductive electrodes on a rule fixedly united with the guide 20;

an inductive encoder, composed of a sensor fixedly united with the carriage 35, having alternated signal transmission and sensor coils and a network of conductive electrodes fixedly united with the guide 20, where the electrodes induce phase-shifts depending on the position in the signal received by the sensor coils;

a device for directly reading the position, for example a dial indicator or graduated scale;

any other known device for determining the position.

The vertical movement of the carriage 35 is produced by the belt 130 or any other flexible driving element such as a cable or a chain, forming a closed loop around the pulleys 110, actuated by the operator with the aid of the handle 90. The belt drives the mobile carriage through the driving carriage 50 whose function will be described in more detail further below. A counterweight 150, guided by the tube 155, balances the weight of the measuring carriage 35, of the probe 40 and of the driving carriage 50.

According to an embodiment, not represented, each pair of pulleys 110 is replaced by a simple pulley of greater diameter. According to another variant embodiment of the invention, not represented, the belt 130 is driven by an electric motor that can be actuated by the operator by suitable command means, for example a handle, or by the instrument's controller, according to a movement program adapted to the current measurement. Optionally, according to this embodiment, the electric motor placed in the upper part of the column gauge, drives the upper pulley. The lower end of the belt as well as the lower pulleys then become superfluous. Certain features of this motorized embodiment of the invention are described in European patent application EP1319924 in the name of the applicant, which is incorporated herewith by reference.

The measuring carriage 35, according to this embodiment of the invention, will now be described with the aid of FIGS. 3, 4, 5 and 8 that show it from different perspectives. The measuring carriage 35 rolls along the guide 20 thanks to the rollers 36 and bears, through the bent arm 38, the probe 40, not represented in these figures. The driving carriage 50 is free to move relatively to the measuring carriage 35 along a direction parallel to the measurement axis and to the latter's rolling direction along the guide 20. This movement of the driving carriage 50 relatively to the measuring carriage 35 is possible thanks to the rollers 58 that guide the driving carriage 50 in the direction of the measuring axis as well as to a blade spring, not visible, that pushes the driving carriage 50 against the measuring carriage 35.

Depending on the direction of the measuring axis, the measuring carriage 35 and the driving carriage 50 are connected by an elastic transmission element having the springs 70a, 70b and 72. The spring 72 is sized, in this embodiment, to compensate the weight of the measuring carriage and of the probe 40. The two symmetrical springs 70a and 70b generate return forces that tend to bring back the measuring carriage 35 to a central equilibrium position relatively to the driving carriage 50 when it moves away from this equilibrium position through the action of external forces, for example of a force exerted by the part to be measured on the probe 40.

It would also be possible to simplify this arrangement by using two springs or a single spring instead of the three springs 70a, 70b and 72. The springs could also be replaced, whilst remaining with the frame of the present invention, by one or several elastic elements of any kind, for example elastomer elements or pneumatic devices.

Figure 6:
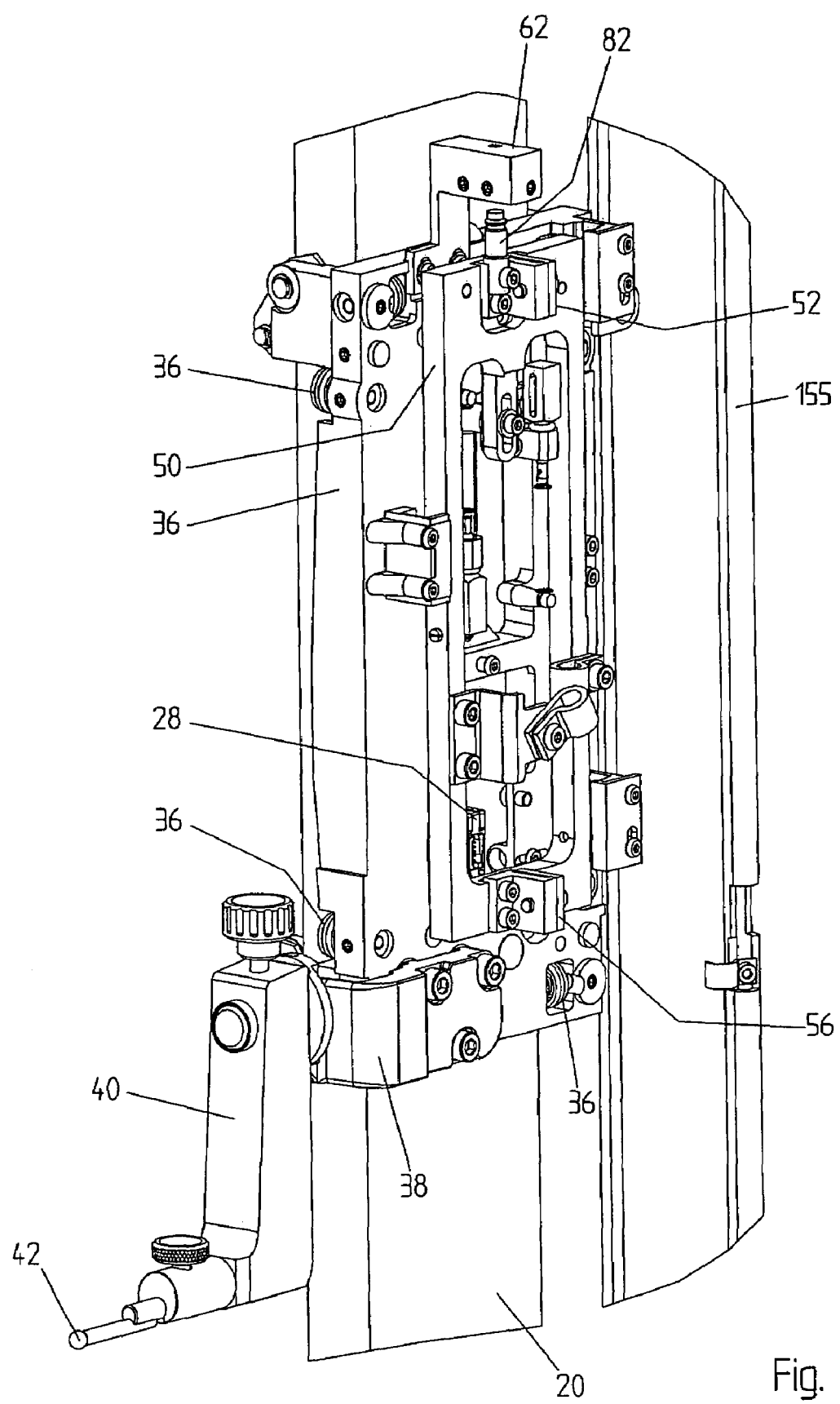
FIGS. 6 and 7 show the measuring and transport carriages according to the invention in a free respectively locked configuration.

FIG. 6 represents the measuring carriage according to this embodiment of the invention in its free state. The measuring carriage 35 is suspended by the elastic transmission element having the springs 70a, 70b and 72 (see FIG. 3) to the driving carriage 50, which is held by the belt (not visible in this figure) fastened to the fasteners 52 and 65. In the absence of any external forces acting on the measuring carriage, the latter is in the position of equilibrium determined by its own weight and by the return force of the springs 70a, 70b and 72.

When the measuring carriage 35 is subjected to a vertical force (for example following a contact of the probe 40 with the part to be measured), the latter is transmitted to the body of the measuring instrument by the elastic transmission element that consequently deforms, thus moving the measuring carriage 35 relatively to the transport carriage 50 up to a new position of equilibrium.

Figure 8:
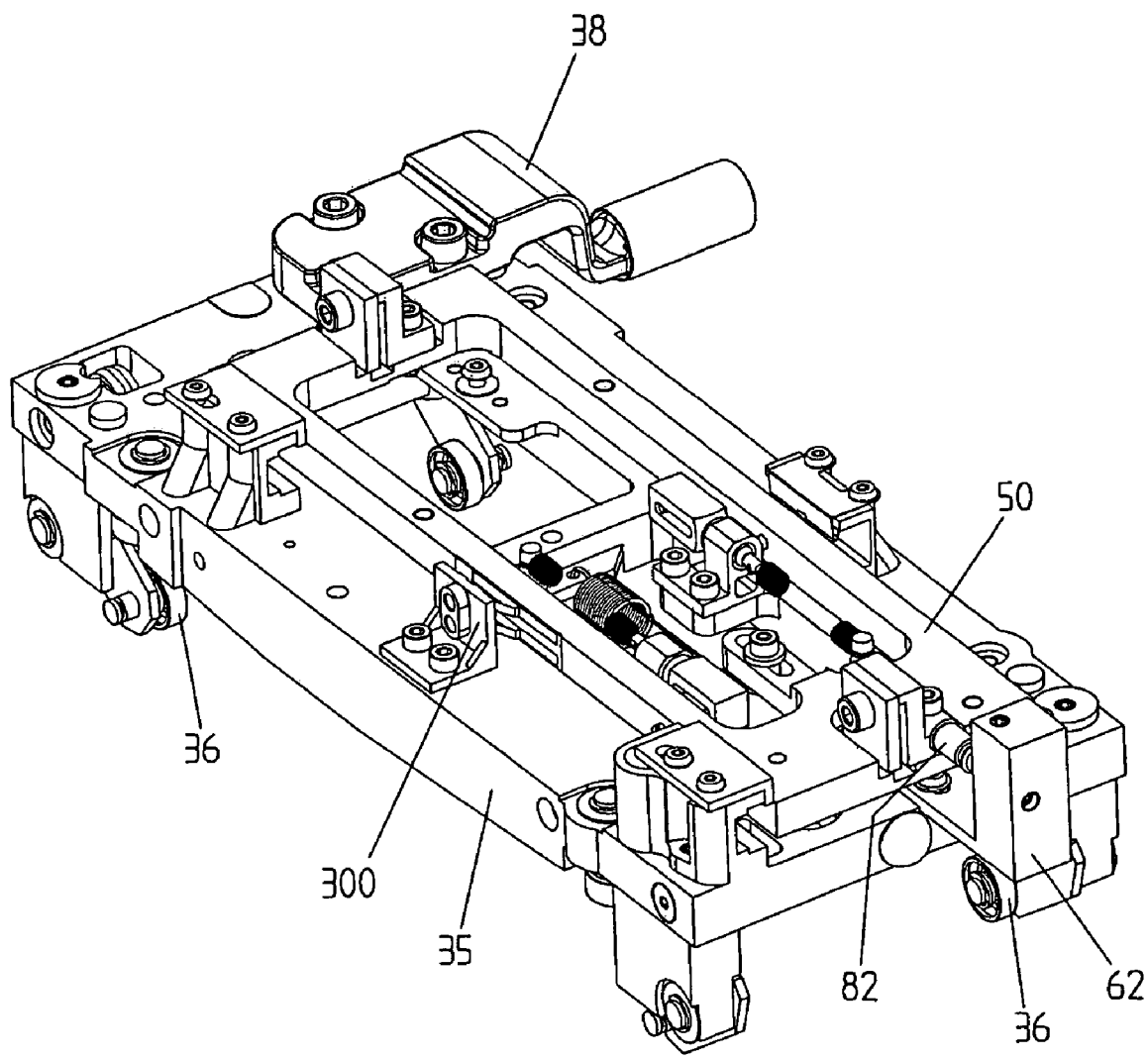

In this manner, the measuring force, i.e. the contact force between the probe 40 and the part to be measured, can be controlled by measuring the linear dimension of the elastic transmission element, for example by the potentiometer 300, visible in FIG. 8, or by any other position sensor. The instantaneous value of the contact force is presented on the display 181. The operator can thus check at any time that the measuring force remains within acceptable limits.

In the free state represented in FIG. 6, the elasticity of the element of the springs 70a, 70b and 72 also allows the probe's small movements to be absorbed and the measuring force to be kept within admissible limits when curved surfaces are measured, for example during bore or diameter measurements.

Other measurement modalities, on the other hand, are easier when the connection between the measuring carriage and the instrument is rigid rather than elastic. This is the case for example of profile measurements performed with a comparator fastened to the probe 40, whose tip is made to slide on a surface of a part to be measured.

With this arrangement, it is possible to acquire simultaneously the vertical coordinates Z (by the transducer 28) and the horizontal coordinates X or Y (by the comparator) of the searched profile. A rigid driving of the measuring carriage is required in this case to ensure a uniform vertical movement of the probe 40.

Figure 7:
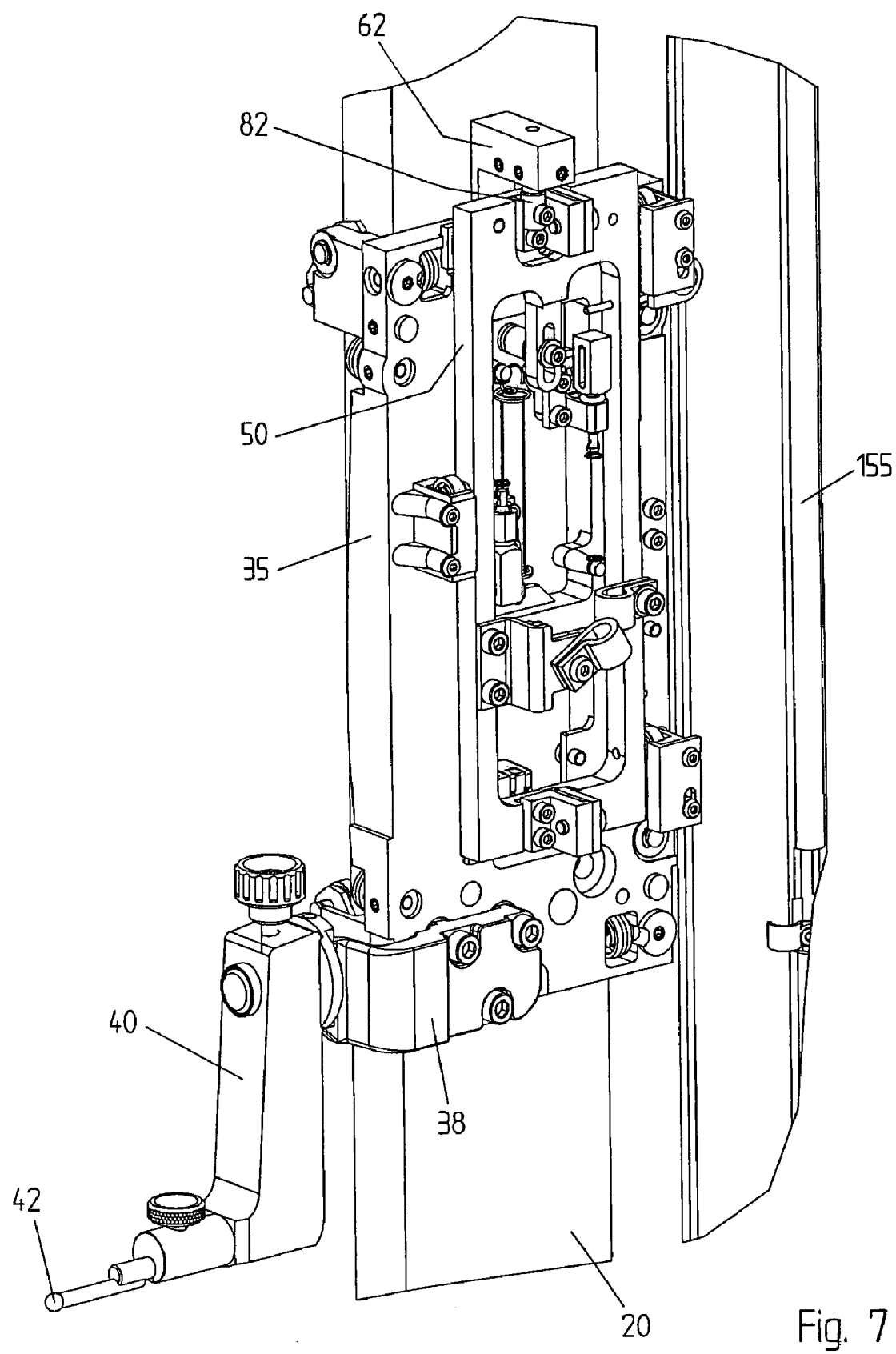

The locked configuration represented in FIG. 7 allows a rigid driving of the probe 40 to be achieved. For this purpose, the notched axle 82 and the quick coupling device 62, placed on the measuring carriage 35 respectively on the driving carriage 50. The operator can fixedly unite the two carriages by exerting a force along the measuring axis on the measuring carriage downwards relatively to the arrangement of the figure, pushing the notched axle 82 against the quick coupling 62. This operation can be performed easily by simply acting on the handle 90, by moving the driving carriage until the upper end of its useful run and by pushing it against the end-of-run stop (not represented) with a force greater than the predetermined locking threshold of the quick coupling 62.

In the locked configuration, the forces acting on the measuring carriage, especially the vertical forces acting on the probe 40, are transmitted to the structure of the measuring instrument 100 by the coupling means 62 and 82, and the elastic transmission element, constituted by the springs 70a, 70b and 72, does not participate in transmitting the force. The position of the probe 40, in the locked configuration, is thus completely determined by the position of the driving means 90 and is independent of the applied force.

Reverting from the locked configuration of FIG. 7 to the free configuration of FIG. 6, the operator can move the measuring carriage to the opposite (lower) end of its useful run and pushing it against the end-of-run stop (not represented) with a force greater than the unlocking threshold of the coupling means 62 and 82.

The locking and unlocking of the measuring carriage 25 also occur by moving the probe 40 into a predetermined coupling position corresponding in this case to the upper end of the run of the probe 40 or into a predetermined uncoupling position corresponding to the lower end of the run of the probe 40.

Figure 10:
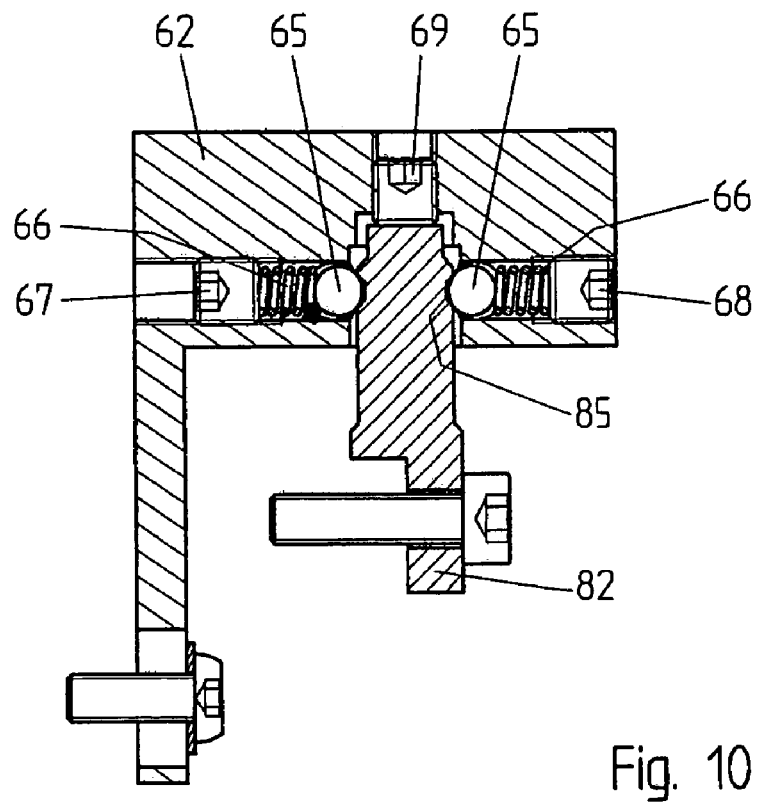
FIGS. 10 and 11 show to variant embodiments of the coupling means according to the invention.

According to one embodiment of the invention, the functioning of the coupling means is illustrated in FIG. 10. The notched axle 82 has a ring groove 85, preferably with a triangular or trapezoidal profile.

The axle 82 engages in a corresponding hole of the quick coupling 62 and is held in place by the two pins 65, pushed radially in the groove 85 by the springs 66. The unit can be fixedly united and disunited reliably by the action of axial forces sufficient to move the pins 65 apart. Furthermore, the symmetric action of the pins 65 ensures an automatic centering of the axle 82.

The screws 67 and 68 allow the force of the springs 66 to be adjusted. The screw 69, on the other hand, serves for adjusting the stop of the axle 82 and the clearance takeup in locked position. For this purpose, the screw 82 is adjusted so that the pins 65 rest on the upper flank of the profile of the groove 85. The locking and unlocking thresholds of the axis 82 with the quick coupling 62 can be determined optimally. It has been observed that a threshold of 15N for locking and unlocking ensures a satisfactory operation.

When the axle 82 and the quick coupling 62 are moved apart, which corresponds to the free configuration of FIG. 6, no force occurs between the coupling means and no measurement error is to be feared.

Figure 11:
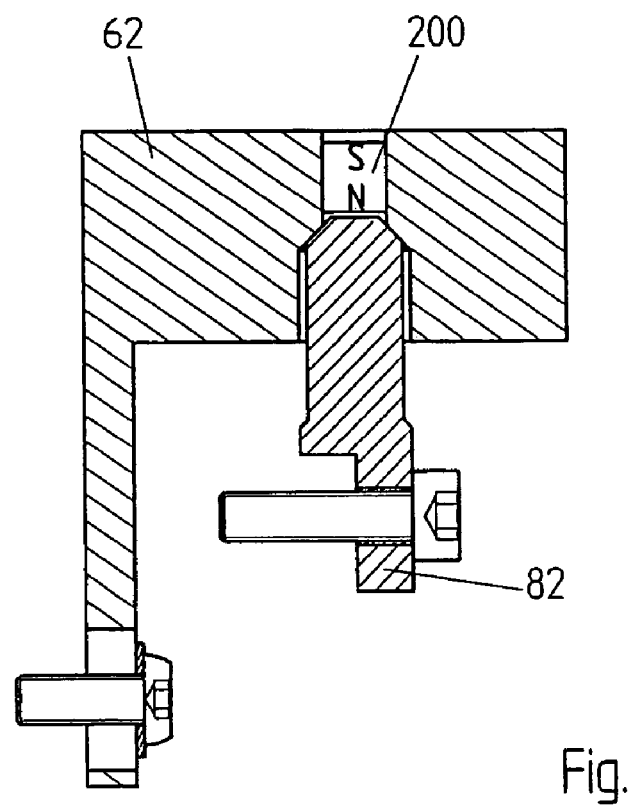

According to another embodiment, represented in FIG. 11, the coupling means include an axle 82 made of a magnetizable material and a permanent magnet 200. The coupling takes place by pushing the axle 82 against the return force of the springs 70a, 70b and 72 and by modifying the dimension of the springs until the axle moves sufficiently closely to the magnet 200 to feel its attraction. The unlocking threshold is determined by the magnetization of the permanent magnet 200.

According to other embodiments, not represented, the coupling means include an electromagnetic actuator, for example an electro-magnet, capable of being actuated by the operator, or any other suitable coupling means.

Advantageously, the state of the coupling means can be determined by the controller of the measuring instrument, for example on the basis of the indication from the relative position transducer 300 or by another appropriate detection device. The operating program of the instrument 100 can thus indicate, by the display 181, the state of the coupling means. The program can also trigger an alarm when the coupling state is incompatible with a selected measuring mode, for example when a bore measurement is selected with the locked carriage.

Figure 9:
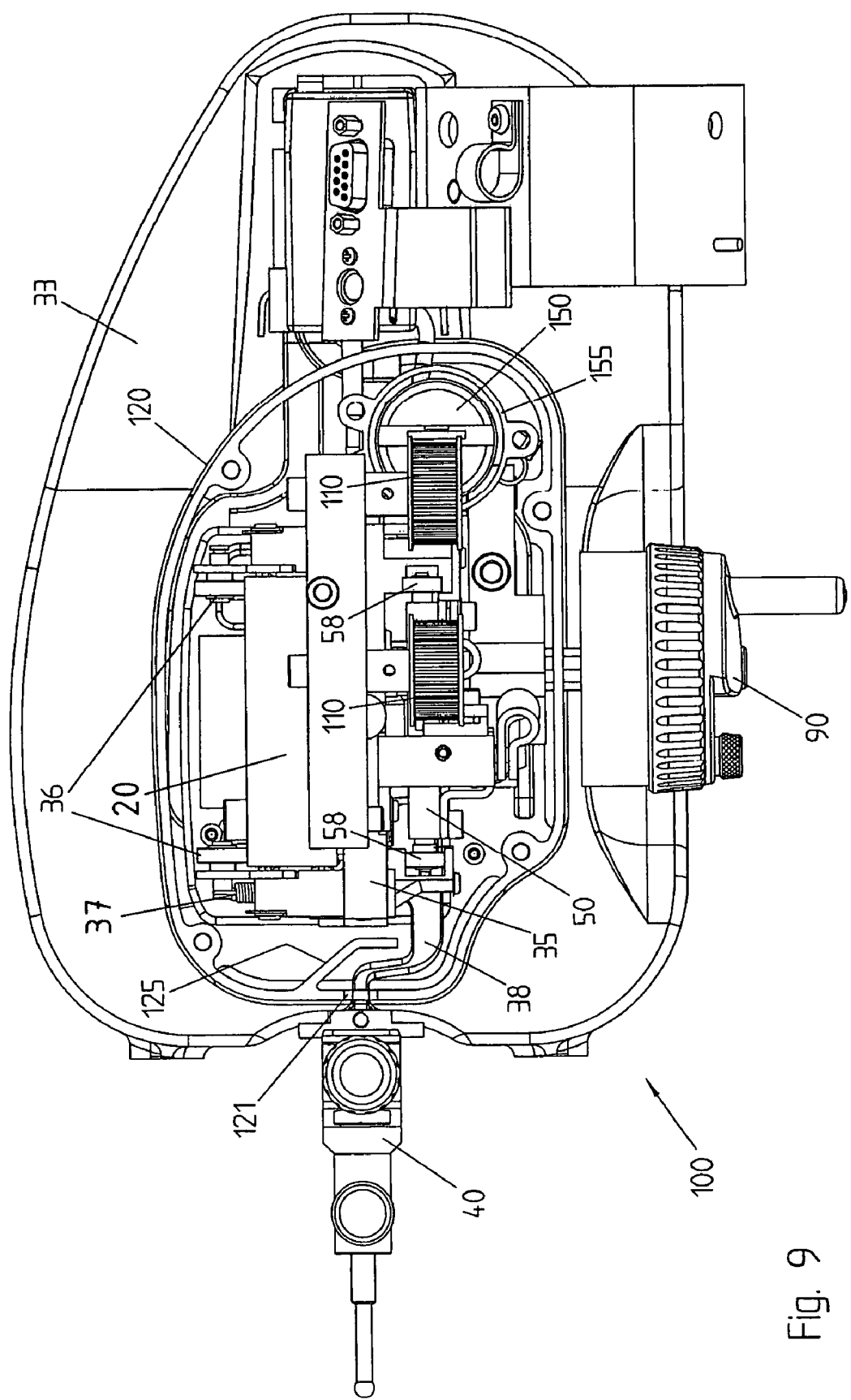
FIG. 9 illustrates a cross section of the measuring instrument of FIG. 1 in its casing.

FIG. 9 shows a cross section of the measuring instrument in which one can see the casing 120 bearing a rectilinear slit 121 parallel to the measuring axis to allow the arm 38 of the probe 40 to pass. A baffle 125 behind the slit 121 restricts the passage of dust particles as well as oil and water droplets coming from outside. The bend shape of the arm 38 follows the baffle's profile so that no contact occurs between the arm 38 and the casing 120.

This shape of casing protects the inside volume in which are to be found the elements of the measuring instrument 100 that are sensitive to atmospheric pollution. However, access to the measuring carriage 35 is very difficult or impossible without disassembling the casing 120. One will thus understand the advantage of the invention, which allows the measuring carriage to be locked and unlocked without having access to the volume protected by the casing 120.

The present invention also includes measuring devices having the claimed characteristics, wherein the elastic transmission element is made otherwise than by two carriages sliding one on the other and connected by springs. The one skilled in the art will understand that the elastic transmission element and the corresponding coupling means could take on any appropriate shape and configuration or be lodged in other elements of the measuring instrument, for example in the driving handle 90, whilst still remaining within the frame of the present invention.

The present invention is also not restricted to the case of a driving having a belt or another flexible transmission element but also includes for example measuring instruments with the claimed characteristics in which the probe is driven directly by a jack cylinder or by a linear motor.

Although the embodiments of the invention, supplied by way of example, refer in particular to a height gauge, the invention is not restricted to this type of device but includes also all the dimension measuring instruments having the claimed characteristics. The one skilled in the art will understand in particular that the invention can apply also to the case of a machine for measuring three-dimensional coordinates, having one or more axles as claimed or even to a machine-tool with one or several axles having the claimed characteristics.

REFERENCE

20 Guide
22 Rule
28 Transmission sensor
33 Base
35 Carriage, measuring carriage
36 Carriage guiding rollers
37 Spring for clearance takeup of the carriage
38 Bent arm
40 Probe
42 Contact sphere
50 Transport part, driving carriage
52, 56 Belt fastener
58 Guiding roller of the transport part
62 Connection element of the transport part
65 Pin
66 Springs
67, 68 Adjustment screws
69 Adjustable stop
70 *a, b* Return springs
72 Equilibration spring
82 Carriage connection element
85 Groove
90 Handle, driving device
100 Dimension measuring instrument
110 Pulleys
120 Envelope
121 Slit
125 Baffle
130 Belt
150 Counterweight
155 Counterweight guiding tube
180 Panel
181 Display
185 Control keys
200 Magnet
300 Potentiometer, force transducer

The invention claimed is:

1. Dimension measuring instrument including:
   a mobile carriage capable of moving parallel to a guide, with the guide defining a measuring axis;
   a driving device connected to the carriage by a transmission including an elastic transmission element, so as to determine the linear movement of the mobile carriage;
   a probe connected to the mobile carriage and designed to be brought into contact with a part to be measured;
   coupling means that can be actuated by the operator and capable of taking up an unlocked state, wherein the forces acting on the mobile carriage are transmitted by the elastic transmission element that is free to deform under the action of these forces, and a locked state, wherein the forces acting on the mobile carriage are transmitted by the coupling elements without influencing the elastic transmission element;
   wherein the measuring instrument includes a protective casing surrounding a protected volume in which the mobile carriage and the guide are placed.

2. The dimension measuring instrument of claim 1, wherein the state of the coupling means can be modified from the outside without inserting instruments or parts of the human body inside the protected volume.

3. The dimension measuring instrument of claim 2, wherein the state of the coupling means can be modified by applying to the mobile carriage a force greater than a predetermined threshold.

4. The dimension measuring instrument of claim 2, wherein the state of the coupling means can be modified by moving the probe into a predetermined coupling position or into a predetermined uncoupling position.

5. The dimension measuring instrument of claim 1, wherein the state of the coupling means can be modified by an electromagnetic actuator.

6. The dimension measuring instrument of claim 1, including a position sensor generating a position signal indicating the position of the mobile carriage relatively to the measuring axis, and an electronic control and display device for displaying the position of the probe according to the position signal.

7. The dimension measuring instrument of claim 6, wherein the position sensor is a sensor of the type opto-electronic, inductive, capacitive or magneto-resistive.

8. The dimension measuring instrument of claim 6, wherein the electronic control and display device is lodged inside a second tight casing.

9. The dimension measuring instrument of claim 8, wherein the electronic device lodged in the second tight casing also includes data input means, for example keys.

10. The dimension measuring instrument of claim 1, including a force transducer generating a force signal indicating the force acting on the mobile carriage.

11. The dimension measuring instrument of claim 10, wherein the force transducer includes a dimension sensor sensitive to a linear dimension of the elastic transmission element.

12. The dimension measuring instrument of claim 1, wherein the driving device includes an electric motor.

13. The dimension measuring instrument of claim 1, wherein the driving device can be actuated manually by the operator.

14. The dimension measuring instrument of claim 1, wherein the coupling means include a pair of connecting elements, the connecting elements being fixedly united in the locked state and moved apart in the free state.

15. The dimension measuring instrument of claim 14, wherein the elastic transmission element is connected on the one hand to the mobile carriage and on the other hand to a transport part, the relative position of the mobile carriage and of the transport part being variable according to the force transmitted by the elastic transmission element, one of the coupling means being fixedly united with the mobile carriage, another coupling means being fixedly united with the transport part, both coupling means being pushed into contact when the dimension of the elastic transmission element exceeds a predetermined threshold.

16. The dimension measuring instrument of claim 15, wherein the elastic transmission element includes one or several springs.

17. The dimension measuring instrument of claim 14, wherein the coupling means are arranged to become fixedly united when they are pushed one against the other with a force exceeding a predetermined locking threshold and to become disunited after having become united when they are separated by a force exceeding a predetermined unlocking threshold.

18. The dimension measuring instrument of claim 17, wherein one of the coupling means includes an axle provided with a groove and the other connection element includes a cavity/hollow designed to accommodate the axle and two pins arranged symmetrically relatively to the axle engaging into the latter's groove when the coupling means are in the locked state.

19. The dimension measuring instrument of claim 14, wherein the coupling means become fixedly united following a magnetic force generated by one or more permanent magnets.

20. The dimension measuring instrument of claim 1, including a sensor for generating a signal indicating the state of the coupling means.

21. The dimension measuring instrument of claim 1, wherein thee protective casing includes a longitudinal slit parallel to the measuring axis, having a baffle to limit the access of alien bodies to the protected volume, the probe including a bent connection arm that follows the profile of the baffle, allowing the probe to come outside the protected volume without contact with the protective casing.

22. The dimension measuring instrument of claim 1, having a single vertical measuring axis so as to constitute a height gauge.

23. The dimension measuring instrument of claim 1, having several orthogonal measuring axes.

* * * * *